United States Patent [19]

Goodfinger et al.

[11] 3,887,793

[45] June 3, 1975

[54] INTERSTITIAL CONTRASTING CODED MARK LABEL READING SYSTEM

[75] Inventors: Frank Carl Goodfinger, Randolph; Richard H. Tuhro, Norwood, both of Mass.

[73] Assignee: Computer Identics Corporation, Westwood, Mass.

[22] Filed: Jan. 11, 1974

[21] Appl. No.: 432,641

[52] U.S. Cl...... 235/61.11 E; 235/61.12 N; 250/566

[51] Int. Cl....... G06k 7/10; G06k 19/06; G08c 9/06

[58] Field of Search.............. 235/61.11 E, 61.12 N; 250/555, 566

[56] References Cited

UNITED STATES PATENTS

| | | | |
|---|---|---|---|
| 3,752,963 | 8/1973 | Herrin | 235/61.11 E |
| 3,761,685 | 9/1973 | Alpert et al. | 235/61.11 E |
| 3,784,792 | 1/1974 | Dobras | 235/61.11 E |

*Primary Examiner*—Daryl W. Cook
*Attorney, Agent, or Firm*—Joseph S. Iandiorio

[57] ABSTRACT

In a label reading system having means for scanning a label and providing signals representative of information borne by the label, a system for decoding signals derived from the label having a first set of information bearing segments having a first characteristic and at least a second set of information bearing segments disposed interstitially of the first set of segments and having a second characteristic contrasting with the first characteristic, each of the segments in each of the sets representing one of a predetermined number of different states, the decoding system comprising: a first decoder channel responsive to a first set of segments and a second decoder channel responsive to a second set of segments, each of the channels including a load register for accumulating signals representative of a set of information bearing segments, a timing circuit for establishing a recognition period for each of the predetermined number of states and providing to the load register a data signal representative of that state during that period; and a steering circuit, responsive to the timing circuit, for providing a clock pulse to the load register to enter the data signal in response to a signal representative of a segment occurring during that period.

9 Claims, 4 Drawing Figures

INTERSTITIAL CONTRASTING CODED MARK LABEL READING SYSTEM

FIELD OF INVENTION

This invention relates to an improved label reading system, and more particularly to a label for carrying and a decoding system for interpreting interstitially disposed contrasting sets of information bearing segments.

BACKGROUND OF INVENTION

Typical coding schemes applied to labels, objects and other analogous devices employ a set of indicia or marks applied to a contrasting background. The type of contrast depends upon the type of transducer used to read the data e.g. magnetic-non-magnetic for magnetic readers and black-white for optical readers. Some such schemes use binary coded data bearing indicia, that is the indicia may be in either of two states, for example narrow and wide stripes. While other coding schemes use tertiary or even higher codes. The spaces of contrasting characteristics are not used in decoding the marks but often they do to serve to aid in the determination of the size or relative size of the associated marks. Thus these spaces add to the size of the coding area but do little to increase the information density of that area.

SUMMARY OF INVENTION

It is therefore an object of the invention to provide a label reading system which increases the effective information density of the coding area by using more than one interstitital code.

It is a further object of this invention to provide a decoding system for interpreting coded marks on a contrasting background in which the background areas between the marks are themselves coded marks.

It is a further object of this invention to provide a label having two or more sets of coded marks interstitially disposed.

The invention results from the realization that the information density of a coded area can be substantially increased by using the interstitial, contrasting spaces between code marks as an additional set of coded marks and using a unique decoding system to interpret those marks.

The invention is used in a label reading system which has means for scanning a label and providing signals representative of information borne by the label. The invention features a decoding system for decoding signals derived from a label having a first set of information bearing segments having a first characteristic and at least a second set of information bearing segments disposed interstitially of the first set of segments and having a second characteristic contrasting with the first characteristic. Each of the segments in each of the sets represents one of a predetermined number of different states. The decoding system comprises a first decoder channel responsive to a first set of segments and a second decoder channel responsive to a second set of segments. Each of the channels includes a load register for accumulating signals representative of a set of information bearing segments, and a timing circuit for establishing a recognition period for each of the predetermined number of different states and providing to the load register a data signal representative of that state during that period. Each decoder channel further includes a steering circuit, responsive to the timing circuit, for providing a clock pulse to the load register to enter the data signal in response to a signal representative of a segment occurring during that period.

DISCLOSURE OF PREFERRED EMBODIMENT

Other objects, features and advantages will occur from the following description of a preferred embodiment and the accompanying drawings, in which.

Figure 1:
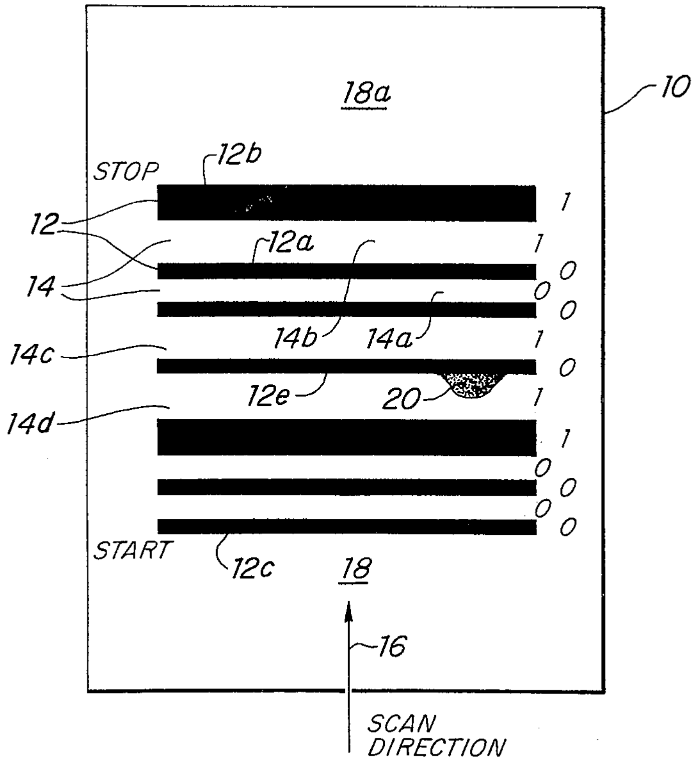
FIG. 1 depicts a label having two interstitially disposed sets of information bearing segments according to this invention.

There is shown in FIG. 1 a label 10 including a plurality of black marks or segments 12 separated by contrasting interstitial white spaces 14. Black marks 12 are encoded as narrow segments 12*a* or wide segments 12*b* in a binary coding scheme; either the narrow or the wide may represent the zero and the other a one. Typically, in prior art systems, the white spaces 14 are used only to separate segments 12. In some cases they may be used to aid in the determination of the relative width of the narrow and wide segments 12. However, in this invention the white spaces 14 form a second set of information bearing segments which are also encoded in binary form, and which also may have either one of two states a narrow state, segment 14*a*, or wide state, segment 14*b;* the white spaces hereinafter are referred to as segments. Thus reading from the bottom towards the top in FIG. 1, the black segments 12 may represent in binary notation the numbers zero, zero, one, zero, zero, zero, one and the set of white segments 14 may represent the numbers zero, zero, one, one, zero, one.

After label 10 has been read by a suitable label reading system, such as described with reference to FIGS. 2–4, infra, the two sets of segments, the set of black segments 12 and the set of white segments 14, may be combined in any desired fashion to represent the encoded information. For example, the binary value of each of the seven black segments 12 and six white segments 14 may be read out interstitially as they appear on label 10 to provide the binary number which extends from the power of $2^0$ to $2^{12}$ or the black segments 12 may be read out as one value representing the powers from $2^0$ to $2^6$ and the white segments 14 may be read out as a second value representing the powers of $2^0$ to $2^5$. Various other schemes may be applied for utilizing the encoded data according to this invention.

In a preferred embodiment the first balck segment, 12*c*, encountered by the scan moving in the direction shown by arrow 16 may be designated a START segment and the last segment encountered, segment 12*b*, may be designated a STOP segment. This permits the label to be read even though the object it is affixed to or the label itself may be in an inverted position with respect to the scan direction 16. Typically a white area 18 which is at least six times the width of a narrow black 12 or narrow white 14 is provided prior to the first information segment to be scanned. With respect to label 10, the area 18 would be provided just prior to the START segment 12*c* but a second such white area 18*a* would also be provided above STOP segment 12*b* to provide for the case in which the label would be read in the reverse direction. The white spaces 18 and 18*a* are equal to or greater than six times the width of narrow white space are provided prior to the first information bearing segment whether it be a black segment 12 or a white segment 14 in order to reset the label reading system in preparation for scanning the information bearing sets of segments on the label, as will be understood from the discussion of FIGS. 2, 3 and 4, infra.

There may also be provided a parity segment for either or both the black information segments 12 and white information segments 14. For example, wide white segment 14 may be used to maintain odd parity in the number of wide white segments. Thus since there are two wide white segments 14*c* and 14*d* white parity segment 14*b* is also made wide to present an odd number, three, of wide white parity segments. Similarly a black segment could be used to provide a black parity check. The parity check could be odd or even and could apply to wide or narrow segments.

In addition to providing a substantially increased information density on any given label this use of two sets of interstitial, contrasting information bearing segments also provides for a more reliable parity check even where only one of the two sets of segments is provided with a parity segment. For example, if because of a printing error or because of dirt on the label a significant dark spot 20 appears as an extension on black segment 12*e* it might cause segment 12*e* to be read as a wide black segment when in fact it is a narrow black segment; however, when spot 20 erroneously adds to the width of segment 12*e* it also simultaneously reduces in that area the width of white segment 14*d* making that white segment 14*d* appear as a narrow segment when in fact it is a wide segment. Thus, since 14*d* would not be considered a wide white segment there would be only one wide white segment 14*c* which when combined with the wide white parity segment 14*b* would give an even parity not an odd parity and therefore indicate an error which would cause the reading of this label to be rejected.

Although in FIG. 1, label 10 is depicted as having two sets of contrasting segments simply illustrated as black segments 12 and white segments 14 this is not a necessary limitation of the invention. The two sets of segments may have various contrasting characteristics e.g. two different colors, or retroreflective and non-retroreflective material, magnetic and non-magnetic or radioactive and not radioactive. Further, although in FIG. 1, label 10 is shown as having but two sets of interstitial contrasting information bearing segments there may be three, four or any number of mutually interstitially disposed and mutually contrasting sets of segments.

Figure 2:
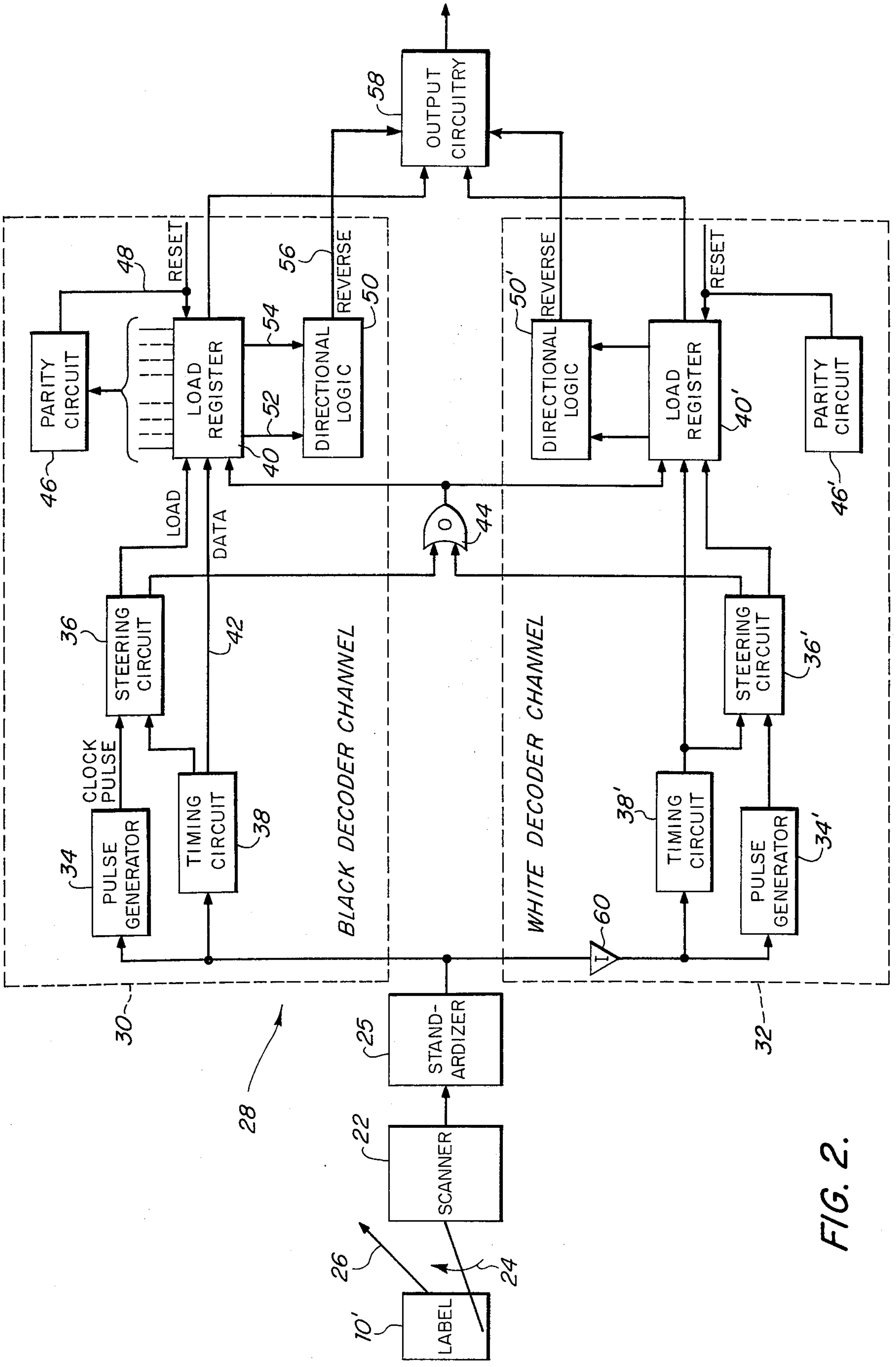
FIG. 2 is a block diagram of a decoding system for reading a label such as shown in FIG. 1 according to this invention.

Label 10′, FIG. 2, may be read by a scanner such as an optical scanner 22 which scans vertically in the direction shown by arrow 24 across label 10′ as it moves tranversely past scanner 22 in the direction shown by arrow 26. Signals representative of the information bearing segments on label 10′ are provided by scanner 22 to a standardizer 25 which uses conventional pulse shaping circuitry to standardize the shapes and amplitudes of the incoming signals so that all narrow segments are represented by one standardized pulse and all wide segments are represented by a second standardized pulse.

For simplicity this embodiment of the invention is described as designed to read labels having two sets of information bearing segments: black segments and white segments. From standardizer 25 the signals are submitted to the decoding system 28 which includes a black decoder channel 30 and white decoder channel 32. In black decoder channel 30 each black pulse is submitted to pulse generator 34 to produce a clock pulse at the end of that black pulse which is delivered to steering circuit 36. The same black pulse is submitted to the timing circuit 38 where it initiates a timing cycle that eliminates those black pulses which are too short or too long to represent valid segments. Timing circuit 38 also generates a first signal which represents the period during which a narrow pulse may be recognized and a second signal which represents a period during which a wide pulse may be recognized. These signals are also submitted to steering circuit 36. If the clock pulse occurs during the narrow recognition period signal or during a wide recognition period signal, steering circuit 36 will provide a load signal to load register 40 which will enable it to receive data on its data input line 42. The data input line is provided with a high signal during the narrow recognition period and a low signal at all other times so that during a wide recognition period the load signal developed and delivered to load register 40 would cause a low signal to be loaded as data into load register 40 while the load signal delivered to load register 40 during a narrow recognition period would cause a high level signal to be loaded as data into load register 40. Either the high or the low level may be designated a one and the other zero for purposes of binary encoding.

If, however, the clock pulse from pulse generator 34 is received by steering circuit 36 at any time other than during the narrow or wide recognition periods no load signal is provided to load register 40. Rather a reset signal is provided to OR gate 44 which immediately resets load register 40 in the black decoder channel 30 and a similar load register 40′ in the white decoder channel 32.

A conventional parity circuit 46 may be provided to verify the parity of label 10 and to produce a reset signal on line 48 to nullify the data already in load register 40 if a proper verification can not be made. A directional logic circuit 50 may also be provided to determine whether the label has been read in the forward direction i.e. beginning with the START segment and ending with the STOP segment as shown in FIG. 1 or in the reverse direction. Directional logic circuit 50 monitors the first and last stages of register 40 via line 52 and 54 and produces a reversing signal on line 56 to the output circuitry if the label has been read in the reverse direction.

Output circuitry 58 may utilize suitable conventional circuits to present the data derived from the set of black segments and the data derived from the set of white segments in whatever relationship it is desired as discussed supra.

White decoder channel 32 operates in the same manner as black decoder channel 30 and like parts have been given like numbers primed with respect thereto. An inverter 60 is provided in white decoder channel 32 to invert the standardized signal so that the white pulses in the white decoder channel 32 are of the same polarity as the black pulses in black decoder channel 30 so that the same circuitry can be used in both channels.

When any given white signal, specifically areas 18 or 18*a*, FIG. 1, read by scanner 22 is equal to or exceeds the width of six times the width of a narrow segment it produces a reset to load registers 40 and 40' to prepare the system for the imminent reading of a label.

Figure 3:
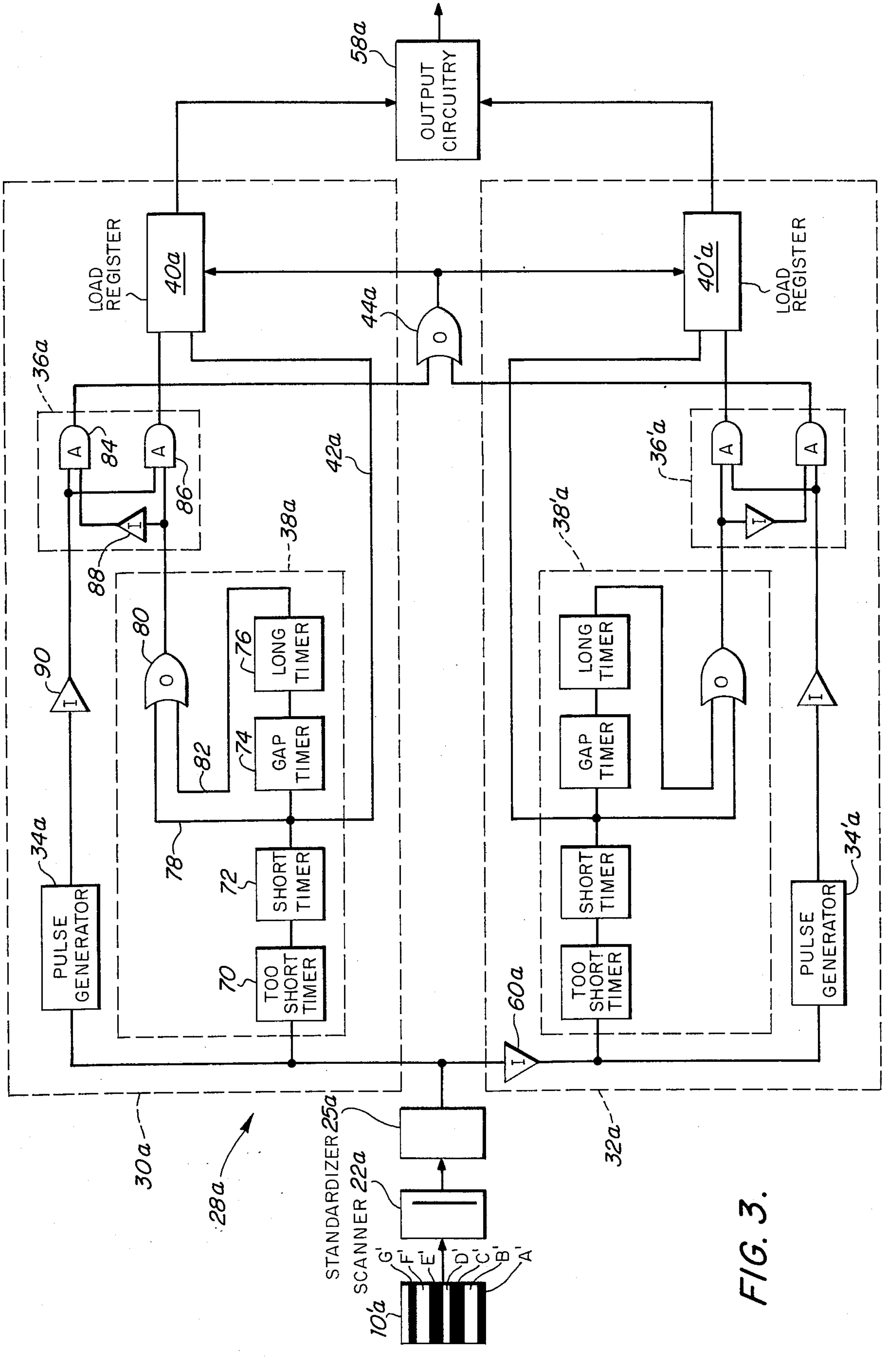
FIG. 3 is a more detailed diagram of the decoding system of FIG. 2.

The operation of the system of FIG. 2 and especially the operation of steering circuit 36 and timing circuit 38 is shown in more detail in FIG. 3 wherein like parts have been given like numbers accompanied by a lower case *a* with respect to FIG. 2. As shown in FIG. 3 timing circuit 38*a* includes four independent timing circuits, a too short timer 70, short timer 72, gap timer 74 and long timer 76. Each of these timers may be made up of a one-shot multivibrator circuit which stays high for a predetermined time after it is triggered. For example, too short timer 70 has a duration of 2.5 microseconds; short timer 72 has a duration of 5 microseconds; gap timer 74 has a duration of 1 microsecond and long timer 76 has a duration of 5 microseconds for reading a typical label. At the beginning of the signal representing a black information bearing segment too short timer 70 is triggered. After 2.5 microseconds the too short timer returns to its other state and triggers short timer 72 which remains high for a period of 5 microseconds. During this 5 microsecond period a high signal is provided on line 42*a* to load register 40*a* and a signal is provided on line 78 to OR gate 80. At the end of the 5 microsecond duration when short timer 72 returns to its other state the signals on lines 42*a* and 78 also return to the low state and gap timer 74 is triggered to remain high for a period of 1 microsecond. Following this 1 microsecond period long timer 76 is triggered to remain high for a period of 5 microseconds. During this 5 microsecond period a high signal is provided on line 82 to OR gate 80.

Steering circuit 36*a* comprises two AND gates 84, 86 and an inverter gate 88. An additional inverter gate 90 is provided at the output of pulse generator 34*a*. Pulse generator 34*a* produces a negative going clock pulse at the end of each black signal that it receives. This negative going pulse is changed to a positive going pulse by inverter gate 90 before it is submitted to one input of AND gate 84. The other input to AND gate 84 is derived from inverter gate 88. The output of inverter gate 90 is also applied to one input of AND gate 86; the other input of AND gate 86 comes directly from OR gate 80. Thus if a signal from inverter gate 90, provided at the end of a black signal, occurs either during the period of the short timer 72 designed to bracket a narrow segment or during the 5 microsecond period of long timer 76 designed to bracket a wide segment there will be an output from AND gate 80 which will enable the other input of AND gate 86 and cause a load signal to be administered to load register 40*a*. This signal, then, can only occur during either the narrow segment recognition period of short timer 72 or the wide segment recognition period of long timer 76. If it occurs during the period of short timer 72 then line 42*a* will be at a high level and a high level data signal will be loaded into load register 40*a*. Since the only other time that a load signal can occur is during the period of long timer 76, when by definition short timer 72 can not be at a high level, then the data signal on line 42*a* will be clocked into load register 40*a* as a low level. If the clock pulse from inverter gate 90 occurs at a time other than during the narrow segment recognition period set by short timer 72 or the wide segment recognition period set by long timer 76 OR gate 80 will be at a low level causing inverter 88 to provide a high level to the second input to AND gate 84 enabling AND gate 84 to provide a reset signal to OR gate 44*a* which will reset load registers 40*a* and 40'*a*.

Figure 4:
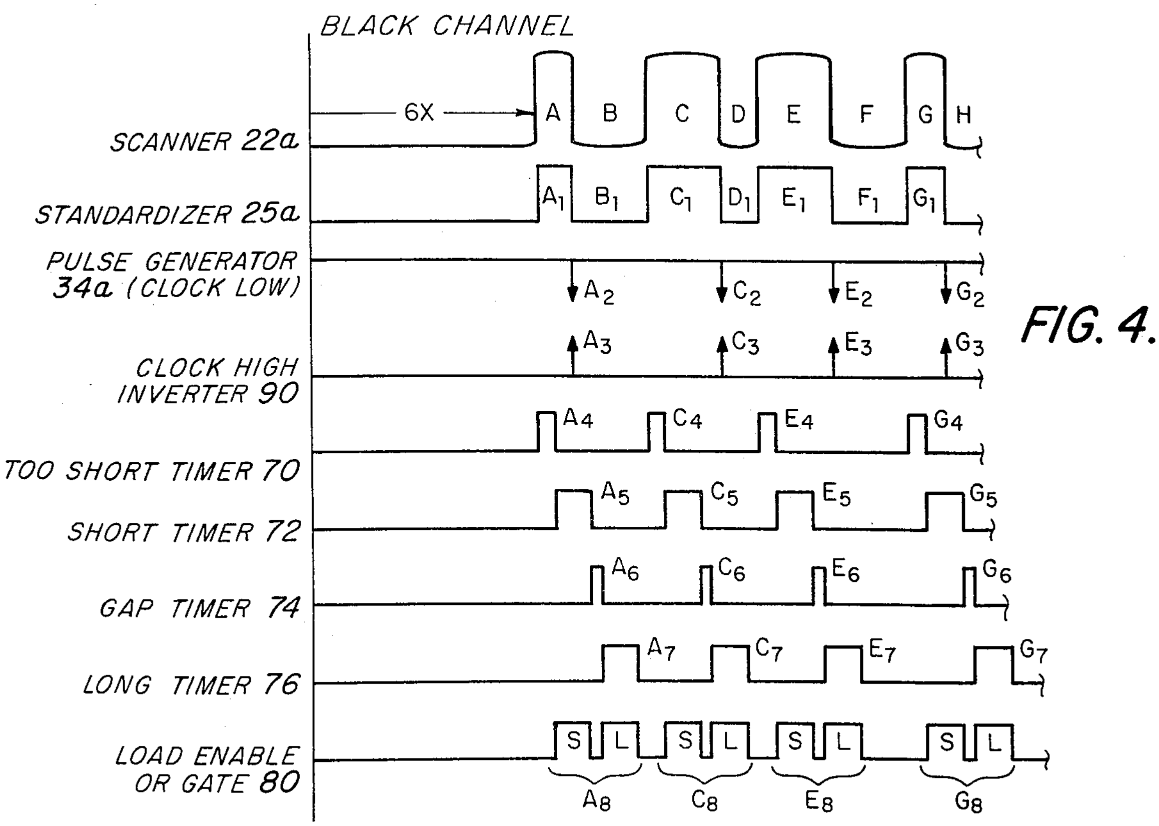
FIG. 4 is a timing diagram showing the signals that appear at various locations in the decoding system shown in FIG. 3.

The operation of the system of FIG. 3 may be better understood with reference to the timing diagrams of FIG. 4. As the first few segments A', B', C', D', E', F' and G' of label 10'*a*, FIG. 3, are being read, a series of signals A, B, C, D, E, F and G, FIG. 4, are produced by scanner 22*a*. The positive pulses A, C, E and G represent black information segments while the negative going pulses B, D and F represent white information segments. All of the signals A, B, C, D, E, F and G are submitted to standardizer 25*a* which uses conventional pulse shaping circuits to provide signals $A_1$, $B_1$, $C_1$, $D_1$, $E_1$, $F_1$ and $G_1$ that are uniform in amplitude and width. Signals $A_1$, $B_1$, $C_1$, $D_1$, $E_1$, $F_1$ and $G_1$ are fed to pulse generator 34*a* where they produce the pulse generator output signal clock low $A_2$ , $C_2$, $E_2$ and $G_2$ on the negative going edge of the black signals. These signals are converted to positive going pulses $A_3$, $C_3$, $E_3$ and $G_3$ by inverter 90.

Simultaneously, the signals $A_1$, $B_1$, $C_1$, $D_1$, $E_1$, $F_1$ and $G_1$ are supplied to the input of too short timer 70 which in response produces the signals $A_4$, $C_4$, $E_4$ and $G_4$ beginning at the positive going edge of signals $A_1$, $C_1$, $E_1$ and $G_1$ and lasting for a period of approximately 2.5 microsecond. At the end of that period the negative going edges of signals $A_4$, $C_4$, $E_4$ and $G_4$ from too short timer 70 trigger short timer 72 to produce the signals $A_5$, $C_5$, $E_5$ and $G_5$ of approximately 5 microsecond duration. In the same manner gap timer 74 produces signals $A_6$, $C_6$, $E_6$ and $G_6$ and long timer 76 produces signals $A_7$, $C_7$, $E_7$ and $G_7$. OR gate 80 subject to signals $A_5$ and $A_7$, $C_5$ and $C_7$, $E_5$ and $E_7$, $G_5$ and $G_7$ produces enabling signals $A_8$, $C_8$, $E_8$ and $G_8$ to AND gate 86. Thus the high clock outputs $A_3$, $C_3$, $E_3$ and $G_3$ from the inverter gate 90 occurring during either part of enabling signals $A_8$, $C_8$, $E_8$ and $G_8$ i.e. the part S derived from the short timer 72 or the part L derived from the long timer 76, cause the load signal to be produced by AND gate 86 to load register 48 enabling load register 48 to load the high or low level appearing on data line 42*a*. For example, in the case of enabling signal $A_8$ the clock high signal $A_3$ occurs during the first part S of the enable signal $A_8$, during the period of the short timer which is the narrow segment recognition period and so a high level will be provided on lines 42*a* to be entered as data into the register 40*a*.

In contrast the clock high signal $C_3$ occurs during the second part L of enable signal $C_8$ derived from the long timer 76 during the wide segment recognition period and so a low level on line 42*a* will be delivered as data to load register 40*a*.

Other embodiments will occur to those skilled in the art and are within the following claims:

What is claimed is:

1. In a label reading system having means for scanning a label and providing signals representative of information borne by the label, a system for decoding signals derived from a label having a first set of information bearing segments having a first characteristic and at least a second set of information bearing segments disposed interstitially of said first set of segments and having a second characteristic contrasting with said first characteristic, each of said segments in each of said sets representing one of a predetermined number of different states, said decoding system comprising:

a first decoder channel responsive to a first set of segments and a second decoder channel responsive to a second set of segments, each of said channels including:

a load register for accumulating signals representative of a set of information bearing signals;

a timing circuit for establishing a recognition period for each of the predetermined number of different states and providing to said load register a data signal representative of that state during that period; and a steering circuit, responsive to said timing circuit, for enabling a clock pulse to said load register to enter said data signal in response to a signal representative of a segment occurring during that period.

2. The system of claim 1 in which said decoding system includes a reset gate for resetting each of said load registers and each steering circuit in each of said decoder channels produces a reset signal to said reset gate in response to a signal representative of a segment occurring at a time other than a said period.

3. The system of claim 1 in which said label includes at least one orientation segment and each said decoder channel includes a directional logic circuit for determining whether a label has been read in the forward or reverse direction and controlling the output circuitry when the label is read out of said load register.

4. The system of claim 1 in which said label includes a parity segment for at least one of said sets of segments and the respective decoder channel includes a parity circuit for determining whether parity has been met by the segment signals in the load register.

5. The system of claim 1 in which said predetermined number of states is two and said segments are designated wide and narrow and in each decoder channel said timing circuit includes a short timer for providing a recognition period for narrow segments and a long timer for providing a recognition period for wide segments.

6. The system of claim 5 in which said timing circuit further includes an initial timer prior to said short timer for eliminating signals which are too short and an intermediate timer between said short and long timers for eliminating signals which occur at the transition area between narrow and wide signals.

7. The system of claim 1 in which there are only two sets of information bearing segments.

8. The system of claim 1 in which said timing circuit generates said data signals.

9. In a label reading system having means for scanning a label and means for providing signals representative of information borne by a label, in combination, a label having a first set of information bearing segments having a first characteristic and at least a second set of information bearing segments disposed interstitially of said first set of segments and having a second characteristic contrasting with said first characteristic, each of said signals in each of said sets representing one of a predetermined number of different states and a decoding system for decoding signals derived from said label including:

a first decoder channel responsive to a first set of segments and a second decoder channel responsive to a second set of segments, each of said channels including:

a load register for accumulating signals representative of a set of information bearing signals;

a timing circuit for establishing a recognition period for each of the predetermined number of different states and providing to said load register a data signal representative of that state during that period; and a steering circuit, responsive to said timing circuit, for providing a clock pulse to said load register to enter said data signal in response to a signal representative of a segment occurring during that period.

* * * * *